United States Patent
Kim et al.

(10) Patent No.: US 7,015,989 B2
(45) Date of Patent: Mar. 21, 2006

(54) LIQUID CRYSTAL DISPLAY DEVICE USING DUAL LIGHT UNIT

(75) Inventors: Kyeong Jin Kim, Goonpo-si (KR); Hoon Kang, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 105 days.

(21) Appl. No.: 10/834,848

(22) Filed: Apr. 30, 2004

(65) Prior Publication Data

US 2004/0246412 A1   Dec. 9, 2004

(30) Foreign Application Priority Data

May 12, 2003 (KR) ............... 10-2003-0029897
Nov. 12, 2003 (KR) ............... 10-2003-0079746

(51) Int. Cl.
*G02F 1/1335* (2006.01)

(52) U.S. Cl. ..................... 349/63; 349/113
(58) Field of Classification Search ......... 349/63, 349/65, 113
See application file for complete search history.

(56) References Cited

U.S. PATENT DOCUMENTS

| | | | |
|---|---|---|---|
| 6,266,108 B1 * | 7/2001 | Bao et al. | 349/63 |
| 6,288,760 B1 * | 9/2001 | Sawayama | 349/63 |
| 6,545,734 B1 * | 4/2003 | Cornelissen et al. | 349/63 |
| 6,742,921 B1 * | 6/2004 | Umemoto et al. | 362/561 |
| 6,879,354 B1 * | 4/2005 | Sawayama et al. | 349/63 |

FOREIGN PATENT DOCUMENTS

| | | |
|---|---|---|
| EP | 1 389 775 A3 | 7/2004 |
| JP | 2000 206523 A | 7/2000 |
| JP | 2001 318374 | 11/2001 |
| JP | 2002 062849 A | 2/2002 |
| JP | 2003 005863 A | 1/2003 |

* cited by examiner

Primary Examiner—Toan Ton
(74) Attorney, Agent, or Firm—McKenna Long & Aldridge LLP

(57) ABSTRACT

A dual LCD device includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, and a second front light unit attached to a rear side of the liquid crystal panel, and a partial reflector attached to a front surface of the first front light unit.

37 Claims, 13 Drawing Sheets

LIQUID CRYSTAL DISPLAY DEVICE USING DUAL LIGHT UNIT

This application claims the benefit of the Korean Patent Application Nos. 2003-29897, filed on May 12, 2003 and 2003-79746 filed on Nov. 12, 2003, which are hereby incorporated by reference for all purposes as if fully set forth herein.

BACKGROUND OF THE INVENTION

1. Field of the Invention

The present invention relates to a liquid crystal display device (LCD), and more particularly, to an LCD having dual light units.

2. Description of the Related Art

In general, LCDs are flat panel display devices having a relatively small size, slim profile, and low power consumption. Accordingly, LCDs are commonly used in mobile computers, such as notebook computers, office automation machines, and audio/video machines.

The LCD displays images by manipulating the transmission of light through a liquid crystal material by controlling an electric field induced to the liquid crystal material. The LCD does not necessarily emit the light by itself, but makes use of an external light source. Such a technique is in contrast to other display devices, such as electro-luminescences (ELs), cathode ray tubes (CRTs), and light emitting diodes (LEDs), which emit light on their own.

In general, the LCDs can be classified into two different categories: transmission LCDs and reflective LCDs. The transmission LCD includes a liquid crystal panel having a liquid crystal layer interposed between two substrates. In addition, the transmission-type LCD includes a back light unit that supplies the light to the liquid crystal panel. However, it is difficult to manufacture the transmission LCDs having slim profiles and light weight due to the volume and the weight of the back light unit. In addition, the back light unit requires large amounts of electrical power.

Conversely, the reflective LCDs are not separately provided with light sources, but display images depending on natural (ambient) light conditions. Thus, because the reflective LCDs do not require any additional light sources, the reflective LCDs consume small amounts of electrical power and can be widely employed in mobile display devices, such as electronic notes and personal digital assistants (PDAs). However, when the ambient light is not sufficient, i.e. at night, a brightness level of the reflective LCDs is lowered, whereby the information displayed cannot be read. Thus, to overcome this problem, a method of displaying images under dark conditions includes installing a front light unit in the reflective LCDs.

FIG. 1 is a perspective schematic diagram illustrating a reflective LCD using a front light unit according to the related art, and FIG. 2 is a cross sectional view illustrating the reflective LCD of FIG. 1 using a front light unit according to the related art. In FIGS. 1 and 2, an active LCD 100 includes a reflective liquid crystal panel 120 and a front light unit 110 positioned on the reflective liquid crystal panel 120 to provide light. The reflective liquid crystal panel 120 is provided with a first substrate 121 and a second substrate 122, wherein a diffusing reflective electrode 123 is formed on the second substrate 122. The diffusing reflective electrode 123 reflects ambient light supplied from an upper surface of the reflective liquid crystal panel 120 or reflects incident light emitted from the front light unit 110.

The front light unit 110 includes a light source 111, a light guide plate 112, and a reflective mirror 113, wherein the light source 111 generates light. The light guide plate 112 projects the light onto a display surface of the reflective liquid crystal panel 120. The reflective mirror 113 reflects the light generated from the light source 111 to the light guide plate 112.

In FIG. 2, the upper surface of the light guide plate 112 is formed having a prismatic configuration such that the light supplied from the light source 111 is reflected by an upper surface and a lower surface of the light guide plate 112. Then, the light supplied to the light guide plate 112 is supplied along a direction perpendicular to the reflective liquid crystal panel 120 positioned below the light guide plate 112. Next, the light supplied vertically to the reflective liquid crystal panel 120 is reflected by a reflective electrode 123 of the reflective liquid crystal panel 120, and travels upward over the light guide plate 110, thereby displaying an image.

SUMMARY OF THE INVENTION

Accordingly, the present invention is directed to an LCD using dual light units that substantially obviates one or more problems due to limitations and disadvantages of the related art.

An advantage of the present invention is to provide an LCD that uses a single liquid crystal panel to display images on both front and rear sides.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, an LCD includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, a second front light unit attached to a rear side of the liquid crystal panel, and a partial reflector attached to a front surface of the first front light unit.

In another aspect, an LCD includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, a second front light unit attached to a rear side of the liquid crystal panel, a fine reflecting and scattering film prepared at one of a position between the first polarizing plate and the first front light unit, and a position between the second polarizing plate and the second front light unit, and a partial reflector attached to a front surface of the first front light unit.

In another aspect, an LCD includes a liquid crystal panel having a liquid crystal layer interposed between a first substrate and a second substrate, first and second polarizing plates attached to opposing surfaces of the liquid crystal panel, a first front light unit attached to a front side of the liquid crystal panel, a second front light unit attached to a rear side of the liquid crystal panel, a scattering film prepared at one of a position between the first polarizing plate and the first front light unit, and a position between the second polarizing plate and the second front light unit, and a partial reflector attached to a front surface of the first front light unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
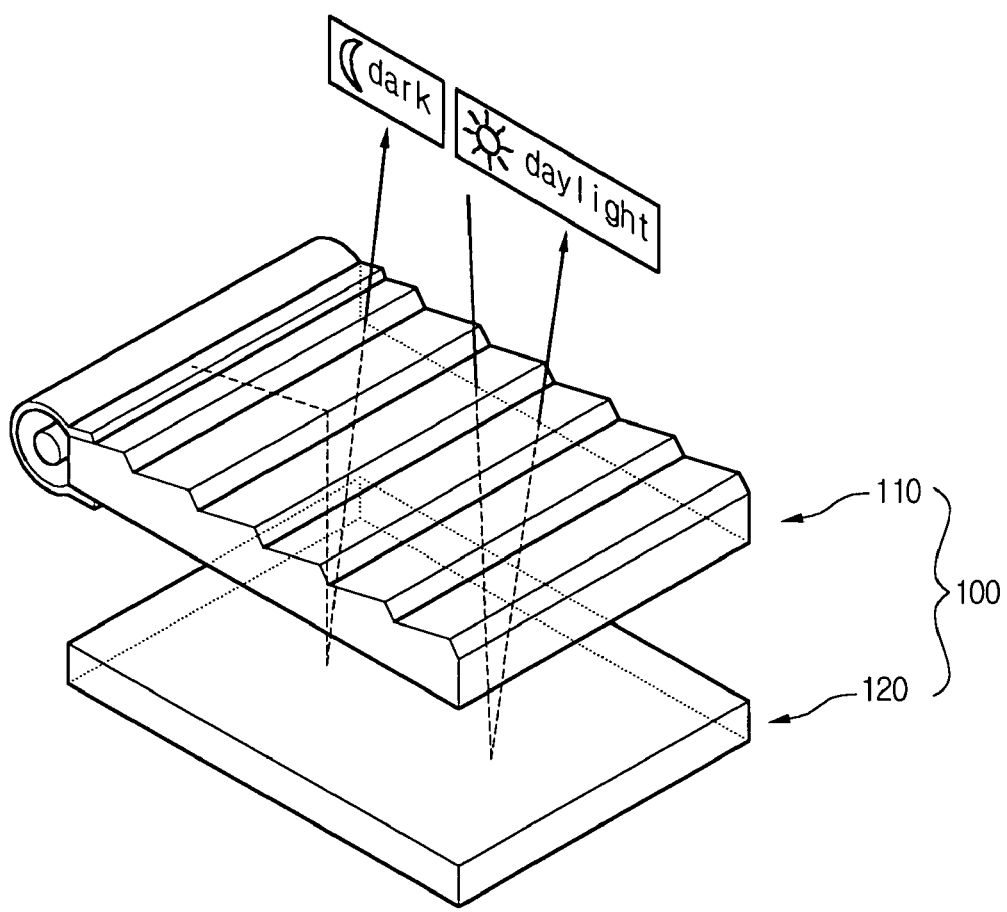
FIG. 1 is a perspective schematic diagram illustrating a reflective LCD using a front light unit according to the related art.
Figure 2:
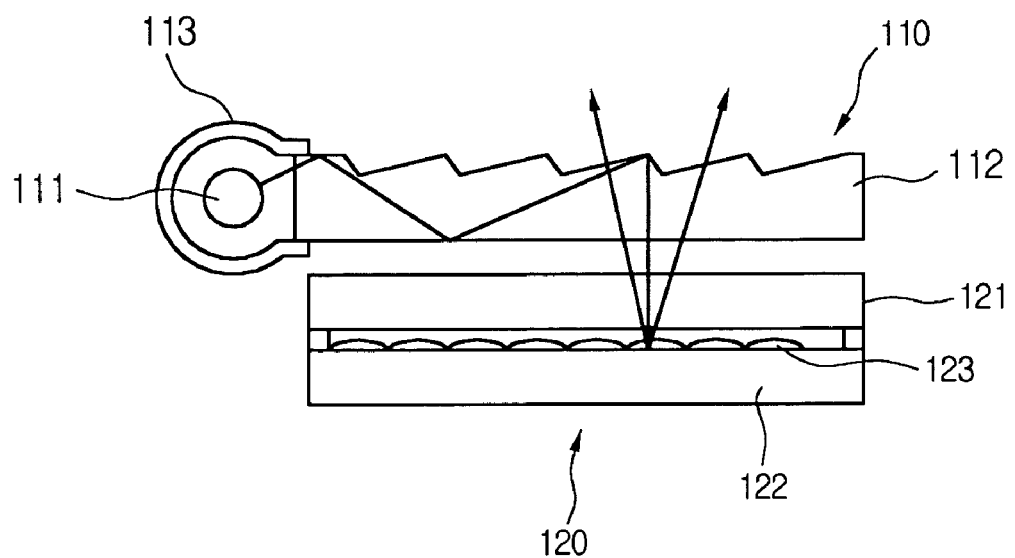
FIG. 2 is a cross sectional view illustrating the reflective LCD of FIG. 1 using a front light unit according to the related art.
Figure 3:
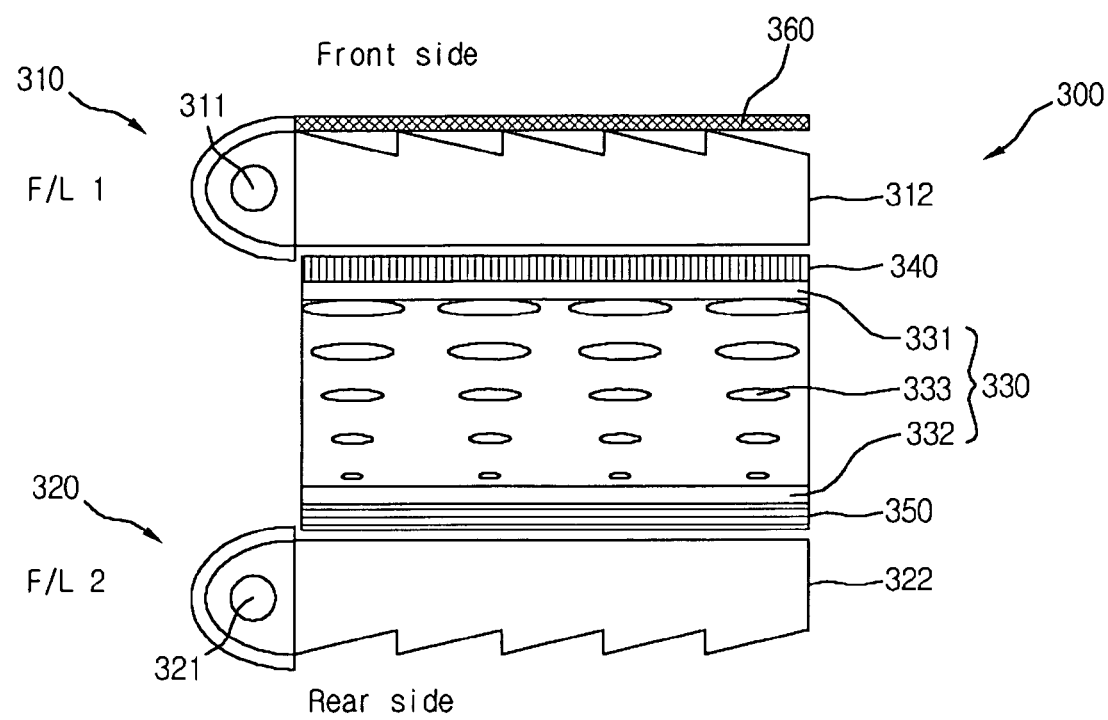
FIG. 3 is a schematic cross sectional view illustrating an exemplary LCD according to the present invention.

FIG. 3 is a schematic cross sectional view illustrating an exemplary LCD according to the present invention. In FIG. 3, an LCD 300 may include a liquid crystal panel 330, a first polarizing plate 340, a second polarizing plate 350, a first front light unit 310, a second front light unit 320, and a partial reflector 360. The liquid crystal panel 330 is formed by filling a liquid crystal layer 333 between a first substrate 331 and a second substrate 332. In addition, the first polarizing plate 340 and the second polarizing plate 350 are attached to both surfaces of the liquid crystal panel 330. For example, the first front light unit 310 is attached to a front side of the liquid crystal panel 330, and the second front light unit 320 is attached to a rear side of the liquid crystal panel 330. Furthermore, the partial reflector 360 is attached to the front surface of first front light unit 310.

In FIG. 3, the exemplary liquid crystal panel 330 is a transmission-type display device, wherein the first substrate 331, such as a color filter substrate, and the second substrate 332, such as a thin film transistor substrate, are spaced apart from each other with a predetermined distance in between. In the liquid crystal panel 330, the second substrate 332 is a transparent substrate having an inner surface upon which gate bus lines and data bus lines are formed in matrix configuration. In addition, a thin film transistor (TFT), which functions as a switching device, is formed adjacent to each crossing of the gate bus lines and the data bus lines. A pixel electrode, which contacts a drain electrode of the TFT, is formed at a position defined by the gate bus line and the data bus line. The first substrate 331 is provided at a location facing the second substrate 332, and includes a transparent substrate having an inner surface upon which a black matrix, a color filter layer, and a common electrode are formed.

Accordingly, if a voltage is supplied to one gate bus line and one data bus line of the liquid crystal panel 330, as described above, only the TFT to which the voltage is supplied is turned ON. Accordingly, a charge is stored on the pixel electrode connected to the drain electrode of the TFT, thereby changing angles of liquid crystal molecules filled between common electrode and the drain electrode (i.e., pixel electrode). Through this process, the LCD may display images on the liquid crystal panel 330 by controlling an electric field induced to the liquid crystal material in order to transmit light or prevent light from passing through the liquid crystal material. For example, the liquid crystal panel 330 may be operated in twisted nematic (TN) mode.

In FIG. 3, both sides of the liquid crystal panel 330 are further provided with the first polarizing plate 340 and the second polarizing plate 350. For example, the first and second polarizing plates 340 and 350 are attached to both surfaces of the liquid crystal panel 330 so that an optical axis of the first polarizing plate 340 is perpendicular to an optical axis of the second polarizing plate 350. Although not shown, a compensation plate is further formed on both surfaces of the liquid crystal panel 330.

The first and second polarizing plates 340 and 350 transmit only light oscillating in one direction so as to polarize ambient light. The compensation plate (not shown) is provided to compensate for phase changes of light within the liquid crystal molecules, thereby solving viewing angle problems. In addition, the compensation plate may be uniaxial or may be biaxial.

In FIG. 3, the first front light unit 310 provided on the front side of the liquid crystal panel 330 includes a light source 311 and a light guide plate 312. Accordingly, linear light projected from the light source 311 of the first front light unit 310 is supplied to the light guide plate 312 to form a uniform surface light source. In addition, because the upper surface of the light guide plate 312 is formed in a prismatic configuration, the light supplied from the light source 311 is reflected by an upper surface and a lower surface within the light guide plate 312 and passes through the light guide plate 312. Then, the light supplied to the light guide plate 312 is supplied along a vertical direction to the liquid crystal panel 330. In addition, a second front light unit 320 is provided at an opposing surface of the liquid crystal panel 330, and includes a second light source 321 and a second light guide plate 322.

The partial reflector 360 is used to function as a mirror at the front side of the liquid crystal panel 330 when the second front light unit 320 is in an OFF state.

The partial reflector 360 is made by coating metallic material such that the reflectivity may be between about 50% and about 90% with respect to the light supplied from an external light source. Otherwise, the partial reflector 360 is made using a dual brightness enhancement film (DBEF).

The partial reflector 360 is formed to have reflectivity varying according to the supplied voltage. For example, the partial reflector 360 includes a cholesteric liquid crystal layer and a λ/4 plate.

Figure 4:
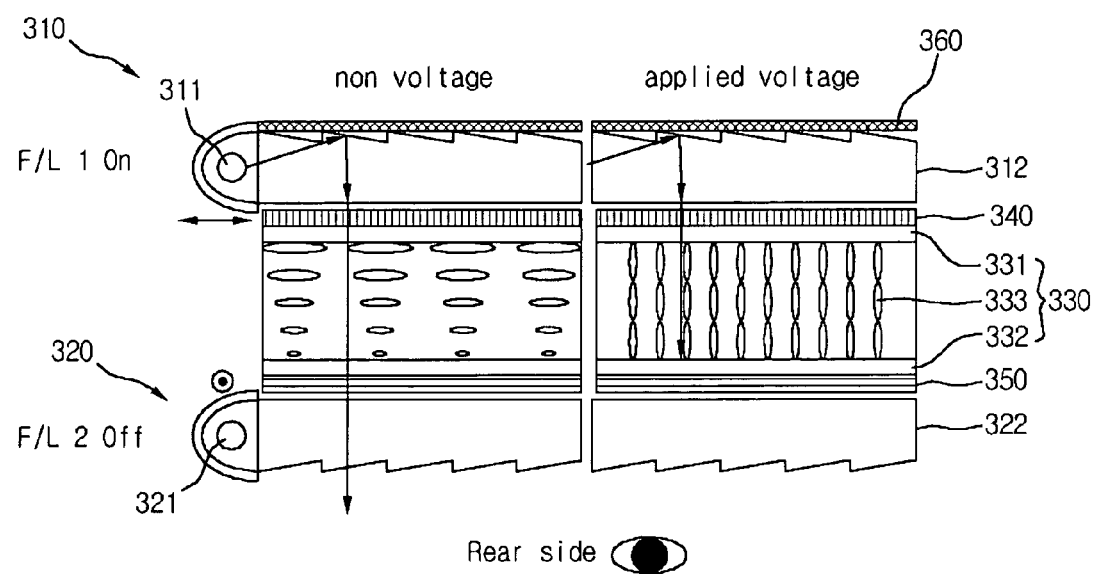
FIG. 4 is a schematic cross sectional view illustrating another exemplary LCD according to the present invention.
Figure 5:
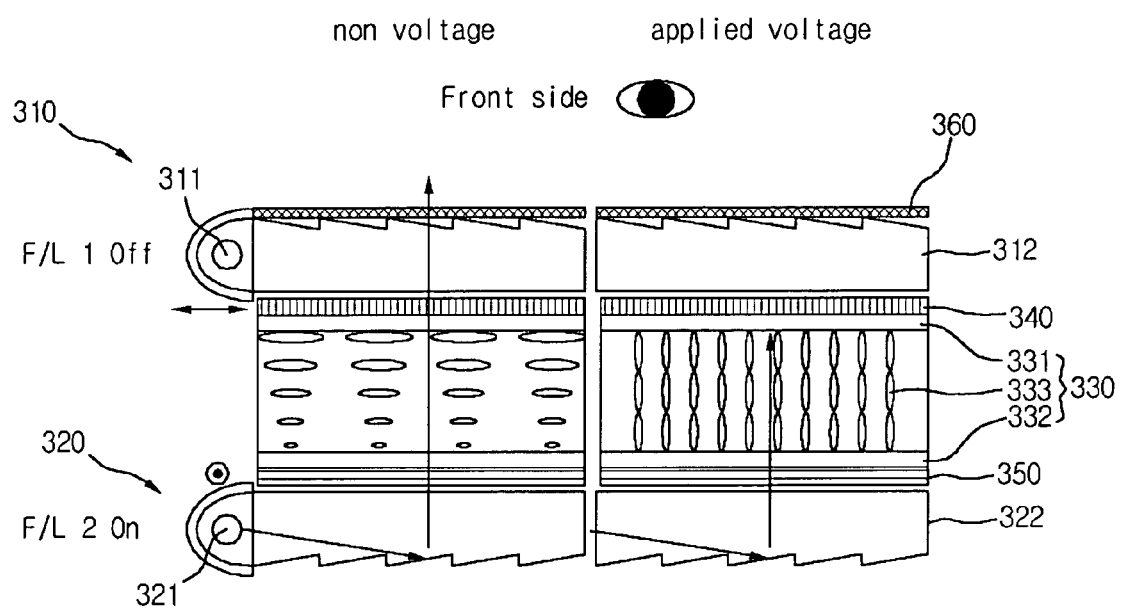
FIG. 5 is a schematic cross sectional view illustrating another exemplary LCD according to the present invention.

FIG. 4 is a schematic cross sectional view illustrating another exemplary LCD according to the present invention, and FIG. 5 is a schematic cross sectional view illustrating another exemplary LCD according to the present invention. In FIG. 4, an image is displayed at a rear side of an LCD when a first front light unit is turned ON, according to the present invention. In FIG. 5, an image is displayed on a front side of an LCD when a second front light unit is turned ON, according to the present invention.

In FIG. 4, if a first front light unit 310 is turned ON and the liquid crystal panel 330 is in a normally white mode, and if no voltage is supplied to the liquid crystal panel 330, then light emitted from the first front light unit 310 is transmitted through the rear side of the liquid crystal panel 330. For example, the light emitted from the first front light unit 310 is transmitted through the first polarizing plate 340 provided on a side of the liquid crystal panel 330, and is converted into linearly polarized light. Then, the transmitted light is rotated along a liquid crystal molecular arrangement by about 90°, and travels in parallel with an optical axis of the second polarizing plate 350 provided on the other side of the liquid crystal panel 330. Accordingly, the light transmitted through the liquid crystal panel 330 is transmitted through the second polarizing plate 350 so that an image may be displayed on the rear side of the LCD.

However, in FIG. 4, when a voltage is supplied to the liquid crystal panel 330, the liquid crystal molecules align along a direction of the induced electric field. Thus, the light that is linearly polarized along a direction by the first polarizing plate 340 maintains its polarization state, and is supplied to the second polarizing plate 350. Accordingly, the light emitted from the first front light unit 310 is blocked by the second polarizing plate 350, and does not reach the rear side of the LCD.

Accordingly, the amount of the light that is transmitted through the liquid crystal panel 330 may be adjusted by selectively controlling the light supplied to the liquid crystal panel 330. Thus, a desired image may be displayed on the rear side of the LCD by controlling the voltage supplied to the liquid panel 330 of an LCD of the present invention, and by determining whether to supply power to a first front light unit 310.

In FIG. 5, if a second front light unit 320 is turned ON and the liquid crystal panel 330 is in a normally white mode, and if no voltage is supplied to the liquid crystal panel 330, then the light emitted from the second front light unit 320 is transmitted through the front side of the liquid crystal panel 330. For example, the light emitted from the second front light unit 320 is transmitted through the second polarizing plate 350 provided on a side of the liquid crystal panel 330, and is converted into linearly polarized light. Then, the transmitted light is rotated along a liquid crystal molecular arrangement by about 90°, and travels in parallel with an optical axis of the first polarizing plate 340 provided on the other side of the liquid crystal panel 330. Accordingly, the light transmitted through the liquid crystal panel 330 is transmitted to the first polarizing plate 340 so that an image may be displayed on the front side of the LCD.

However, as shown in FIG. 5, when a voltage is supplied to the liquid crystal panel 330, the liquid crystal molecules align along a direction of the induced electric field. Thus, the light that is linearly polarized in a direction by the second polarizing plate 350 maintains its polarization state, and is supplied to the first polarizing plate 340. Accordingly, the light emitted from the second front light unit 320 is blocked by the first polarizing plate 340, and does not reach the front side of the LCD.

Accordingly, the amount of light that is transmitted through the liquid crystal panel 330 may be adjusted by selectively controlling the light supplied to the liquid crystal panel 330. Accordingly, a desired image may be displayed on the front side of the LCD by controlling the voltage supplied to the liquid panel 330 of the LCD of the present invention, and by determining whether to supply power to a second front light unit 320.

According to the present invention, an image may be selectively displayed on the front or the rear side of the liquid crystal panel 330 according to whether the first front light unit 310 or the second front light unit 320 of the LCD is turned ON. Accordingly, an LCD may be employed in various types of display devices.

Figure 6:
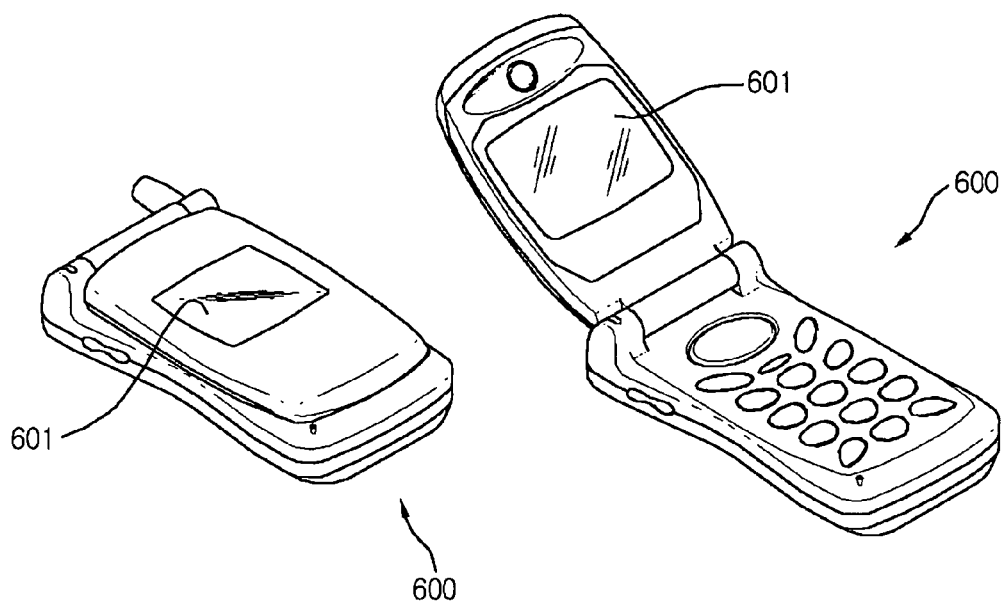
FIG. 6 is a perspective view illustrating exemplary mobile communication terminals according to the present invention.

FIG. 6 is a perspective view illustrating exemplary mobile communication terminals according to the present invention. In FIG. 6, a mobile communication terminal 600 employs an LCD 601 according to the present invention. Accordingly, an image is displayed on the front and rear sides of the liquid crystal panel by using a liquid crystal panel, so that a light weight and slim profile dual display-type mobile communication terminal 600 may be configured. As described above, the LCD using dual light units, according to the present invention, is a transmission LCD having front light units on both sides thereof, so that high quality images may be displayed on the front side and the rear side of the LCD by using a single liquid crystal panel.

The partial reflector provided on a side of the LCD may function as a mirror. Accordingly, a user may use the mobile communication terminal as a mirror at his or her convenience when the LCD does not display any image.

Meanwhile, when the LCD using dual light units is employed in the mobile communication terminal described above, the following problem may occur. If an image is displayed using a transmission LCD in bright ambient conditions that are brighter than the light emitted from the first front light unit, the image displayed on the rear side of the LCD may not be seen very well. To overcome this problem, an LCD including a fine reflecting and scattering film may be used.

Figure 7:
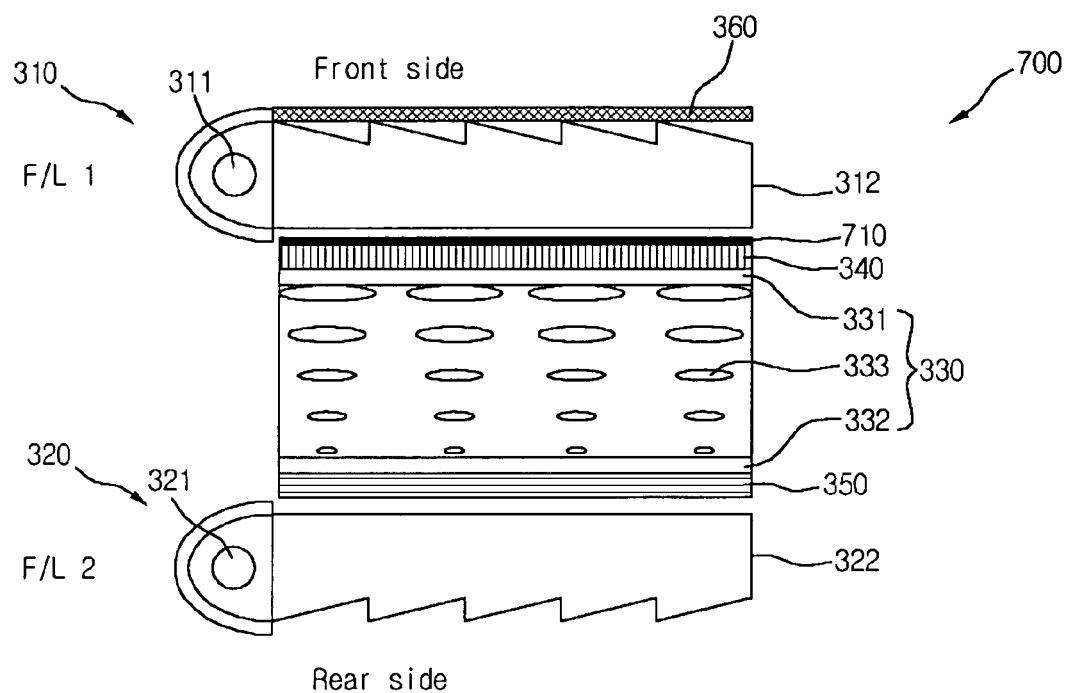
FIGS. 7–10 are schematic cross sectional views illustrating other exemplary LCDs according to the present invention.

FIGS. 7–10 are schematic cross sectional views illustrating other exemplary LCDs according to the present invention. In FIG. 7, an LCD 700 includes a liquid crystal panel 330, a first polarizing plate 340, a second polarizing plate 350, a first front light unit 310, a second front light unit 320, a fine reflecting and scattering film 710, and a partial reflector 360. The liquid crystal panel 330 is formed by filling a liquid crystal layer 333 between a first substrate 331 and a second substrate 332, and the first polarizing plate 340 and the second polarizing plate 350 are attached to both surfaces of the liquid crystal panel 330. In addition, the first front light unit 310 is attached to a front side of the liquid crystal panel 330, and the second front light unit 320 is attached to a rear side of the liquid crystal panel 330. Thus, the fine reflecting and scattering film 710 is included between the first polarizing plate 340 and a first front light unit 310. Additionally, the partial reflector 360 is attached to the front surface of the first front light unit 310.

When an image is displayed on the rear side of the LCD 700 due to a transmission light generated by a light emitted from the first front light unit 310, the fine reflecting and scattering film 710 reflects, to the rear side, ambient light supplied from the rear side of the LCD 700 to the liquid crystal panel 330. However, if an image is displayed on the rear side of the transmission LCD 700 in bright ambient conditions and a brightness of the light emitted from the first front light unit 310 is relatively darker than the bright ambient conditions, then the image displayed on the rear side of the LCD 700 may not be seen very well. Accordingly, the fine reflecting and scattering film 710 is included between the first polarizing plate 340 and a first front light unit 310 to solve such a problem. For example, when the ambient light is relatively bright, the fine reflecting and scattering film 710 reflects the ambient light to the rear side of the liquid crystal panel 330 so that optical efficiency may be enhanced. Thus, the brightness of the image displayed on the rear side of the liquid crystal panel 330 may be enhanced.

The fine reflecting and scattering film 710 also scatters the transmitted light. Accordingly, the fine reflecting and scattering film 710 may prevent moiré phenomenon from occurring, wherein straight or ill-defined interference pattern lines are generated due to a predetermined pattern of the light guide plate 312 of the first front light unit 310 on a screen on which the image is displayed. As commonly known, the moiré phenomenon is known as an interference fringe created when periodic patterns are mutually overlapped with each other. When two or more lattices having similar lattice constants are overlapped with each other and light is irradiated onto the lattices, straight or ill-defined lines having larger periods different from periods of the lattices are generated. The material of the fine reflecting and scattering film 710 includes an Ultra Brightness (UB) film, for example.

Figure 8:
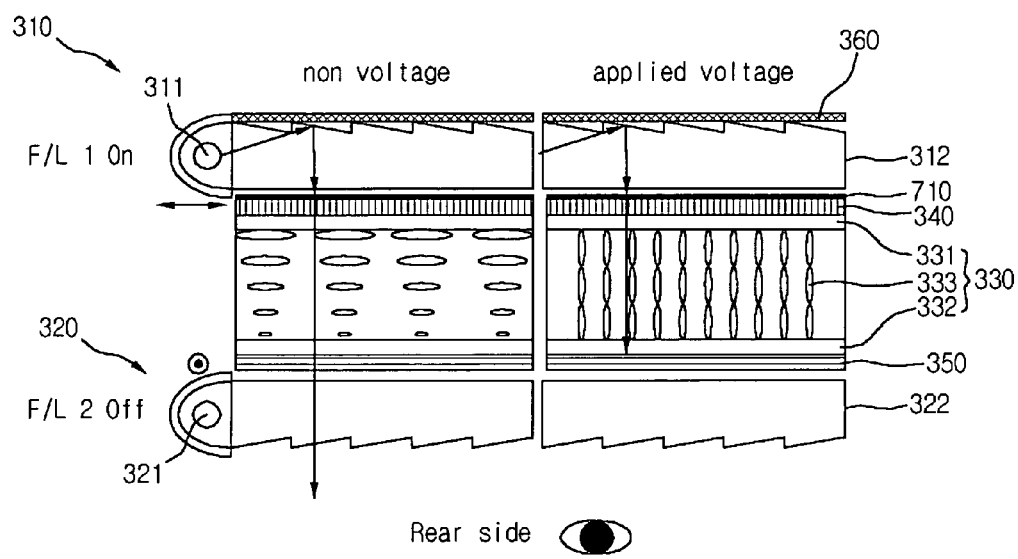
Figure 9:
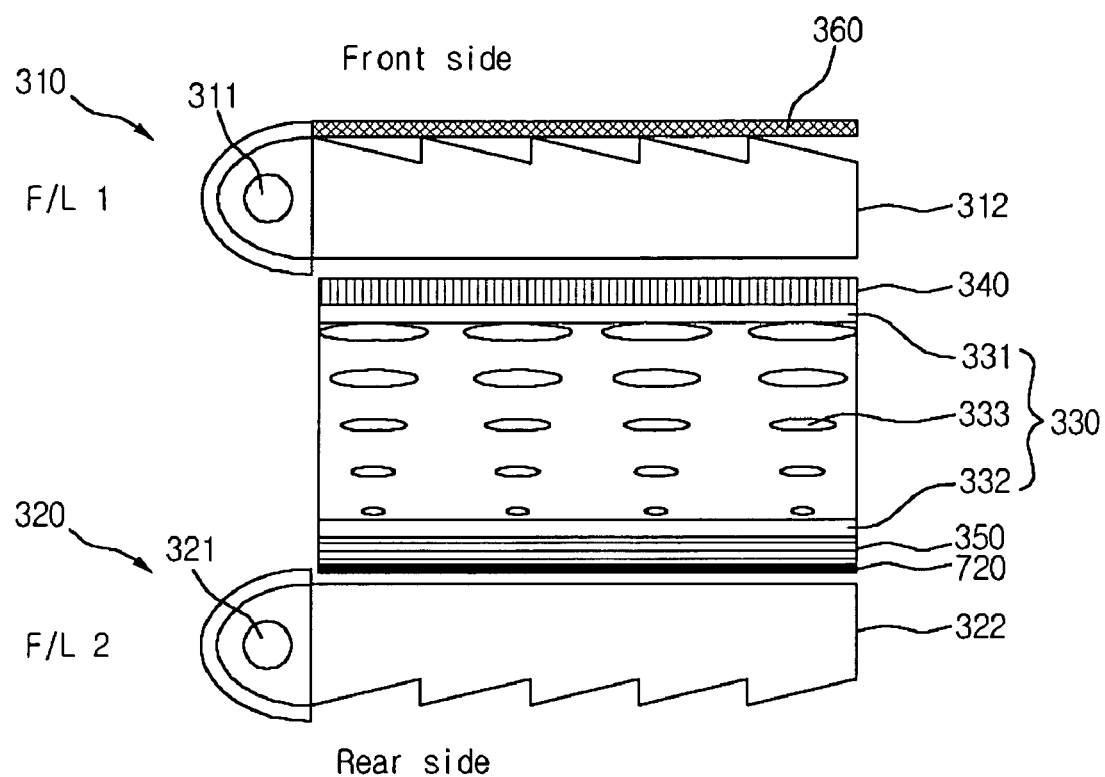

In FIG. 8, if a first front light unit 310 is turned ON and the liquid crystal panel 330 is in a normally white mode, and if no voltage is supplied to the liquid crystal panel 330, then the light emitted from the first front light unit 310 is transmitted through the rear side of the liquid crystal panel 330. For example, the light emitted from the first front light unit 310 is transmitted through the first polarizing plate 340 provided on a side of the liquid crystal panel 330, and is converted into linearly polarized light. The transmitted light is rotated along a liquid crystal molecular arrangement by about 90°, and travels in parallel with an optical axis of the second polarizing plate 350 provided on the other side of the liquid crystal panel 330. Accordingly, the light transmitted through the liquid crystal panel 330 is transmitted to the second polarizing plate 350 so that an image may be displayed on the rear side of the LCD. Thus, when a user sees an image displayed on the rear side of the liquid crystal panel 330 in bright ambient conditions, visibility is excellent and a clear image may be provided due to the external light reflected by the fine reflecting and scattering film 710.

In FIG. 8, when a voltage is supplied to the liquid crystal panel 330, the liquid crystal molecules align along a direction of an induced electric field. Thus, light that is linearly polarized along a direction by the first polarizing plate 340 maintains its polarization state and is supplied to the second polarizing plate 350. Accordingly, the light emitted from the first front light unit 310 is blocked by the second polarizing plate 350 and does not reach the rear side of the LCD.

According to the present invention, the amount of the light that is transmitted through the liquid crystal panel 330 may be adjusted by selectively controlling the light supplied to the liquid crystal panel 330. Thus, a desired image may be displayed on the rear side of the LCD by controlling the voltage supplied to the liquid panel 330 of the LCD, according to the present invention, and by determining whether to supply power to a first front light unit 310.

In FIGS. 7 and 8, the LCD employs the fine reflecting and scattering film 710 to prevent the problems where displayed image is difficult to see or distinguish due to the ambient light supplied from the rear side of the LCD when an image is displayed on the rear side of the LCD. However, as described and shown in FIG. 5, even when an image is displayed on the front side of the LCD, if the ambient light is brighter than the light emitted from the second front light unit 320, the image displayed on the front side of the LCD may not be seen very well.

Figure 10:
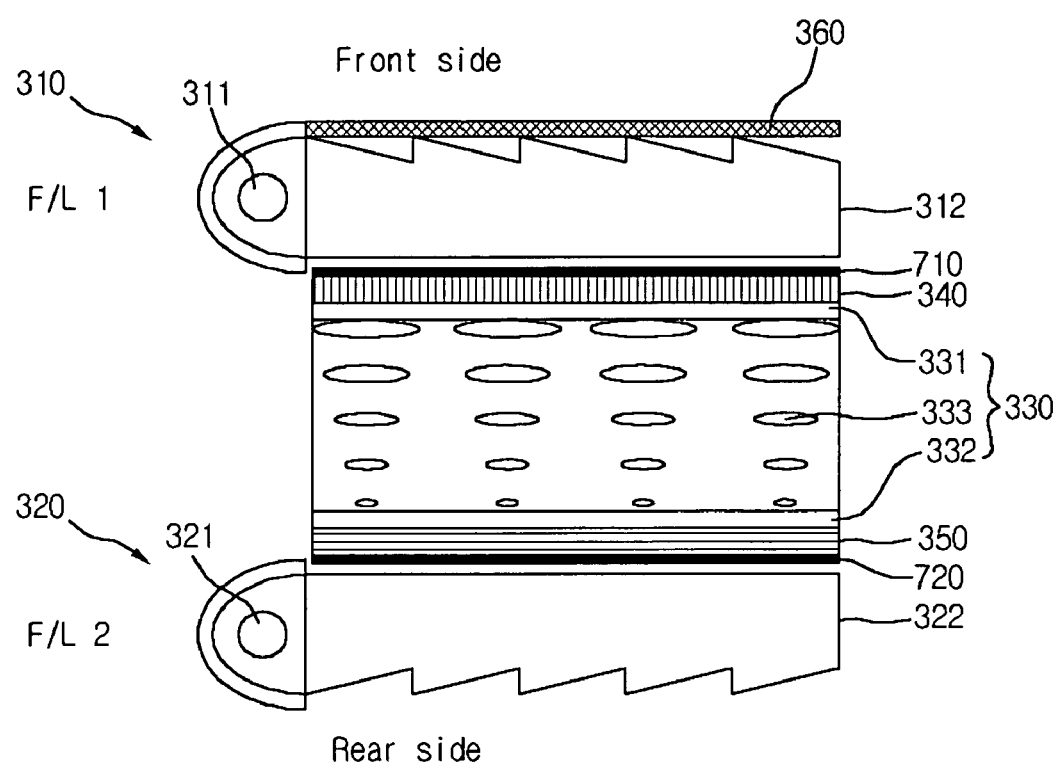

To overcome this problem, an LCD including a fine reflecting and scattering film 710 included between the second polarizing plate 350 and a second front light unit 320 is provided. The function of the fine reflecting and scattering film 710 will be described with reference to FIGS. 7 and 8. Because only the prepared locations of the fine reflecting and scattering films 710 and 720 (shown in FIG. 9) are different from each other, the detailed description on the LCD shown in FIG. 9 will be omitted. As shown in FIG. 10, the fine reflecting and scattering films 710 and 720 may be prepared on the front side and the rear side of the LCD.

Figure 11:
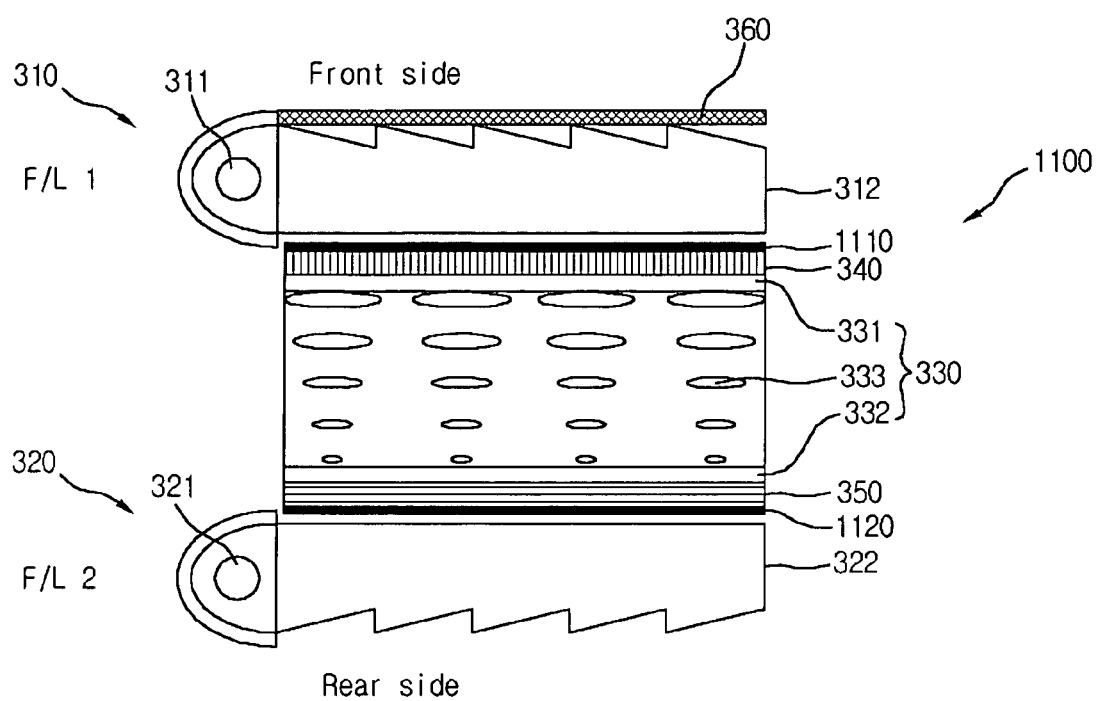
FIG. 11 is a schematic cross sectional view illustrating another exemplary LCD according to the present invention.

FIG. 11 is a schematic cross sectional view illustrating another exemplary LCD according to the present invention. In FIG. 11, an LCD 1100 includes a liquid crystal panel 330, a first polarizing plate 340, a second polarizing plate 350, a first front light unit 310, a second front light unit 320, a first scattering film 1110, a second scattering film 1120, and a partial reflector 360. The liquid crystal panel 330 is formed by filling a liquid crystal layer 333 between a first substrate 331 and a second substrate 332, wherein the first polarizing plate 340 and the second polarizing plate 350 are attached to both surfaces of the liquid crystal panel 330.

In addition, the first front light unit 310 is attached to a front side of the liquid crystal panel 330, and the second front light unit 320 is attached to a rear side of the liquid crystal panel 330. The first scattering film 1110 is included between the first polarizing plate 340 and a first front light unit 310, and the second scattering film 1120 is included between the second polarizing plate 350 and a second front light unit 320. The partial reflector 360 is attached to the first front light unit 310.

Since the first scattering film 1110 is included between the first polarizing plate 340 and a first front light unit 310, moiré phenomenon is prevented from occurring to make the image displayed on the rear side of the liquid crystal panel 330 clear. Similarly, since the second scattering film 1120 is included between the second polarizing plate 350 and a second front light unit 320, moiré phenomenon is prevented from occurring to make the image displayed on the front side of the liquid crystal panel 330 clear. According to the present invention, the LCD 1110, as shown in FIG. 11, includes the first scattering film 1110 and the second scattering film 1120 so that the clearness of the images displayed on both sides of the liquid panel 330 can be both improved.

According to the exemplary embodiments described above, the LCD having a liquid crystal panel may be operating in a TN mode. However, the liquid crystal panel may be operated in various different modes besides the TN mode. For example, the LCD may be operated in an in-plane switching (IPS) mode and a vertical alignment (VA) mode.

Figure 12:
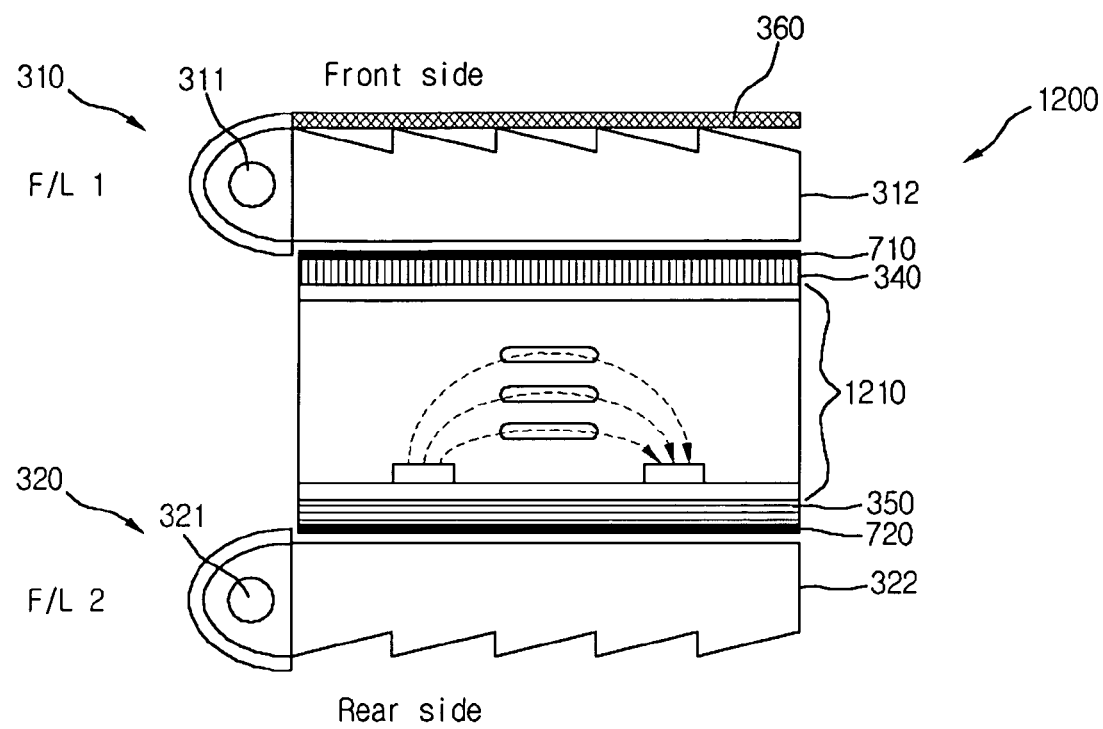
FIG. 12 is a schematic cross sectional view illustrating another exemplary LCD according to the present invention.
Figure 13:
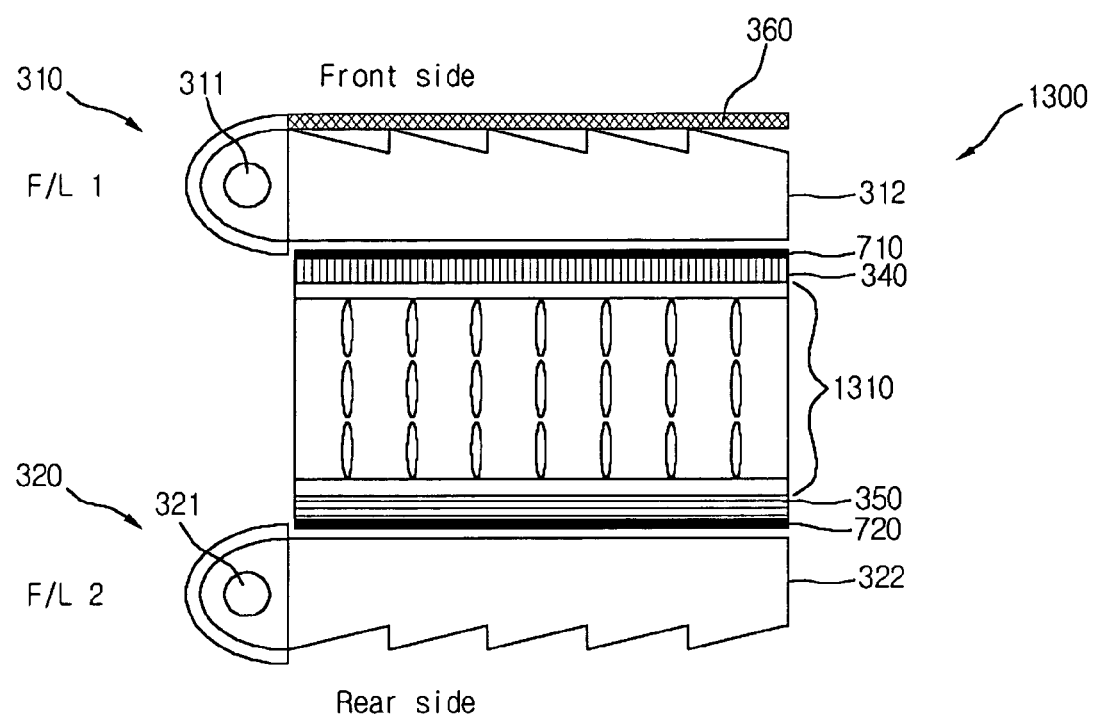
FIG. 13 is a schematic cross sectional view illustrating another exemplary LCD according to the present invention.

FIG. 12 is a schematic cross sectional view illustrating another exemplary LCD according to the present invention. In FIG. 12, an LCD using dual light units and provided with a liquid crystal panel may be operated in an IPS mode. FIG. 13 is a schematic cross sectional view illustrating another exemplary LCD according to the present invention. In FIG.

13, an LCD using dual light units and provided with a liquid crystal panel may be operated in a VA mode.

In FIG. 12, an LCD 1200 operating in an IPS mode includes an IPS mode liquid crystal panel 1210, a first polarizing plate 340, a second polarizing plate 350, a first front light unit 310, a second front light unit 320, a first fine reflecting and scattering film 710, a second fine reflecting and scattering film 720, and a partial reflector 360. The IPS mode liquid crystal panel 1210 manipulates liquid crystal molecules by controlling induced horizontal electric fields. The first polarizing plate 340 and the second polarizing plate 350 are attached to both surfaces of the IPS mode liquid crystal panel 1210. In addition, the first front light unit 310 is attached to a front side of the IPS mode liquid crystal panel 1210, and the second front light unit 320 is attached to a rear side of the IPS mode liquid crystal panel 1210. The first fine reflecting and scattering film 710 is included between the first polarizing plate 340 and a first front light unit 310, and the second fine reflecting and scattering film 720 is included between the second polarizing plate 350 and a second front light unit 320. The partial reflector 360 is attached to the first front light unit 310.

In the LCD 1200 according to FIG. 12, a first image is displayed on the rear side of the LCD 1200 due to the operation of the first front light unit 310, and a second image is displayed on the front side of the LCD 1200 due to the operation of the second front light unit 320. Since the function of the components of the LCD 1200 shown in FIG. 12 is similar to the LCDs described above, the detailed description will be omitted for the sake of brevity.

In FIG. 13, an LCD 1300 operating in a VA mode includes a VA mode liquid crystal panel 1310, a first polarizing plate 340, a second polarizing plate 350, a first front light unit 310, a second front light unit 320, a first fine reflecting and scattering film 710, a second fine reflecting and scattering film 720, and a partial reflector 360. The first polarizing plate 340 and the second polarizing plate 350 are attached to both surfaces of the VA mode liquid crystal panel 1310. In addition, the first front light unit 310 is attached to a front side of the VA mode liquid crystal panel 1310, and the second front light unit 320 is attached to a rear side of the VA mode liquid crystal panel 1310. The first fine reflecting and scattering film 710 is included between the first polarizing plate 340 and a first front light unit 310, and the second fine reflecting and scattering film 720 is included between the second polarizing plate 350 and a second front light unit 320. The partial reflector 360 is attached to the first front light unit 310.

In the LCD 1300 of FIG. 13, a first image is displayed on the rear side of the LCD 1300 due to the operation of the first front light unit 310, and a second image is displayed on the front side of the LCD 1300 due to the operation of the second front light unit 320. Because the function of the components of the LCD 1300 shown in FIG. 13 is similar to the LCDs described above, the detailed description will be omitted for the sake of brevity.

It will be apparent to those skilled in the art that various modifications and variations can be made in the liquid crystal display device using dual light units of the present invention without departing from the spirit or scope of the invention. Thus, it is intended that the present invention covers the modifications and variations of this invention provided they come within the scope of the appended claims and their equivalents.

What is claimed is:

1. A dual LCD device, comprising:
a liquid crystal panel having a liquid crystal layer interposed between a first substrate and a second substrate;
first and second polarizing plates attached to opposing surfaces of the liquid crystal panel;
a first front light unit attached to a front side of the liquid crystal panel;
a second front light unit attached to a rear side of the liquid crystal panel; and
a partial reflector attached to a front surface of the first front light unit.

2. The device according to claim 1, wherein the liquid crystal panel operates in a mode selected from a twisted nematic (TN) mode, an in-plane switching (IPS) mode, and a vertical alignment (VA) mode.

3. The device according to claim 1, wherein the first and second polarizing plates are disposed on both surfaces of the liquid crystal panel such that optical axes of the first and second polarizing plates are perpendicular to each other.

4. The device according to claim 1, wherein the first front light unit is operated to cause a first image to be displayed on the rear side of the liquid crystal panel, and the second front light unit is operated to cause a second image to be displayed on the front side of the liquid crystal panel.

5. The device according to claim 1, wherein the liquid crystal panel operates in a TN mode, such that the first front light unit is in an ON state and an image displayed on the rear side of the liquid crystal panel is in a black mode, and such that the first front light unit is in an OFF state and an image displayed on the rear side of the liquid crystal panel is in a white mode.

6. The device according to claim 1, wherein the liquid crystal panel operates in a TN mode, such that the second front light unit is in an ON state and an image displayed on the front side of the liquid crystal panel is in a black mode, and such that the second front light unit is in an OFF state and an image displayed on the front side of the liquid crystal panel is in a white mode.

7. The device according to claim 1, wherein the partial reflector is a mirror with respect to the front side of the liquid crystal panel when the second front light unit is in an OFF state.

8. The device according to claim 1, wherein the partial reflector is formed to have reflectivity of between about 50% and 90% with respect to a light supplied from the front side of the liquid crystal panel.

9. The device according to claim 1, wherein the partial reflector is formed of a DBEF (dual brightness enhancement film).

10. The device according to claim 1, wherein the partial reflector is formed by coating metallic material.

11. The device according to claim 1, wherein the partial reflector is formed to have reflectivity varying according to a supplied voltage.

12. A dual LCD device, comprising:
a liquid crystal panel having a liquid crystal layer interposed between a first substrate and a second substrate;
first and second polarizing plates on opposing surfaces of the liquid crystal panel;
a first front light unit attached to a front side of the liquid crystal panel;
a second front light unit attached to a rear side of the liquid crystal panel;
a fine reflecting and scattering film prepared at one of a position between the first polarizing plate and the first front light unit, and a position between the second polarizing plate and the second front light unit; and a partial reflector attached to a front surface of the first front light unit.

13. The device according to claim 12, wherein the liquid crystal panel is in one mode selected from the group consisting of TN mode, IPS mode, and VA mode.

14. The device according to claim 12, wherein the first and second polarizing plates are attached to both surfaces of the liquid crystal panel such that optical axes of the first and second polarizing plates are substantially perpendicular to each other.

15. The device according to claim 12, wherein the first front light unit is operated to cause a first image to be displayed on the rear side of the liquid crystal panel, and the second front light unit is operated to cause a second image to be displayed on the front side of the liquid crystal panel.

16. The device according to claim 12, wherein the fine reflecting and scattering film is between the first polarizing plate and the first front light unit and receives ambient light supplied from the rear side of the liquid crystal panel and reflects the received ambient light to the rear side of the liquid crystal panel.

17. The device according to claim 16, wherein the fine reflecting and scattering film is between the first polarizing plate and the first front light unit and enhances a brightness of the image displayed on the rear side of the liquid crystal panel.

18. The device according to claim 12, wherein the fine reflecting and scattering film is between the second polarizing plate and the second front light unit, receives ambient light supplied from the front side of the liquid crystal panel, and reflects the received ambient light to the front side of the liquid crystal panel.

19. The device according to claim 18, wherein the fine reflecting and scattering film is between the second polarizing plate and the second front light unit and enhances a brightness of the image displayed on the front side of the liquid crystal panel.

20. The device according to claim 12, wherein the fine reflecting and scattering film is between the first polarizing plate and the first front light unit and prevents Moiré phenomenon from occurring when an image is displayed on the rear side of the liquid crystal panel due to a light emitted from the first front light unit.

21. The device according to claim 12, wherein the fine reflecting and scattering film is between the second polarizing plate and the second front light unit and prevents Moiré phenomenon from occurring when an image is displayed on the front side of the liquid crystal panel due to a light emitted from the second front light unit.

22. The device according to claim 12, wherein the partial reflector functions as a mirror with respect to the front side of the liquid crystal panel when the second front light unit is in an OFF state.

23. The device according to claim 12, wherein the partial reflector is formed to have reflectivity of 50–90% with respect to a light supplied from the front side of the liquid crystal panel.

24. The device according to claim 12, wherein the partial reflector is formed of a dual brightness enhancement film.

25. The device according to claim 12, wherein the partial reflector is formed by coating a metallic material.

26. The device according to claim 12, wherein the partial reflector is formed to have reflectivity varying according to a supplied voltage.

27. A dual LCD device, comprising:
a liquid crystal panel having a liquid crystal layer interposed between a first substrate and a second substrate;
first and second polarizing plates attached to opposing surfaces of the liquid crystal panel;
a first front light unit attached to a front side of the liquid crystal panel;
a second front light unit attached to a rear side of the liquid crystal panel;
a scattering film prepared at one of a position between the first polarizing plate and the first front light unit, and a position between the second polarizing plate and the second front light unit; and
a partial reflector attached to a front surface of the first front light unit.

28. The device according to claim 27, wherein the liquid crystal panel is formed in one mode of TN mode, IPS mode, or VA mode.

29. The device according to claim 27, wherein the first and second polarizing plates are attached to both surfaces of the liquid crystal panel such that optical axes of the polarizing plates are perpendicular to each other.

30. The device according to claim 27, wherein the first front light unit is operated to cause a first image to be displayed on the rear side of the liquid crystal panel, and the second front light unit is operated to cause a second image to be displayed on the front side of the liquid crystal panel.

31. The device according to claim 27, wherein the scattering film is between the first polarizing plate and the first front light unit and prevents Moiré phenomenon from occurring when an image is displayed on the rear side of liquid crystal panel due to a light emitted from the first front light unit.

32. The device according to claim 27, wherein the scattering film is between the second polarizing plate and the second front light unit and prevents Moiré phenomenon from occurring when an image is displayed on the front side of liquid crystal panel due to a light emitted from the second front light unit.

33. The device according to claim 27, wherein the partial reflector functions as a mirror with respect to the front side of the liquid crystal panel when the second front light unit is in an OFF state.

34. The device according to claim 27, wherein the partial reflector is formed to have reflectivity of 50–90% with respect to a light supplied from the front side of the liquid crystal panel.

35. The device according to claim 27, wherein the partial reflector is formed of a dual brightness enhancement film.

36. The device according to claim 27, wherein the partial reflector is formed by coating metallic material.

37. The device according to claim 27, wherein the partial reflector is formed to have reflectivity varying according to a supplied voltage.

* * * * *